United States Patent
Pieper

(10) Patent No.: US 6,289,694 B1
(45) Date of Patent: Sep. 18, 2001

(54) METHOD AND APPARATUS FOR MELTING GLASS IN U-FLAME AND CROSS-FIRED TANK FURNACES WITH A REDUCTION OF THE $NO_X$ AND CO CONTENT OF THE WASTE GASES

(75) Inventor: Helmut Pieper, Lohr am Main (DE)

(73) Assignee: Beteiligungen Sorg GmbH & Co. KG (DE)

( * ) Notice: Subject to any disclaimer, the term of this patent is extended or adjusted under 35 U.S.C. 154(b) by 0 days.

(21) Appl. No.: 09/296,803

(22) Filed: Apr. 23, 1999

(30) Foreign Application Priority Data

Apr. 28, 1998 (DE) ................................. 198 18 953

(51) Int. Cl.⁷ ............................................. C03B 3/02
(52) U.S. Cl. .................. 65/29.19; 65/136.1; 65/134.6; 65/162; 65/335
(58) Field of Search .................. 65/29.19, 136.1, 65/134.6, 162, 335, 27

(56) References Cited

U.S. PATENT DOCUMENTS

| | | |
|---|---|---|
| 3,506,427 * | 4/1970 | Griem, Jr. . |
| 3,607,190 * | 9/1971 | Penberthy ........................... 65/134.8 |
| 3,838,999 * | 10/1974 | Groves ................................ 65/29.19 |
| 4,328,020 | 5/1982 | Hughes . |
| 4,372,770 | 2/1983 | Krumwiede et al. . |
| 4,375,368 * | 3/1983 | Stevenson ............................. 65/29.1 |
| 4,405,351 * | 9/1983 | Sheinkop ............................. 65/29.21 |
| 4,631,080 * | 12/1986 | Westra et al. ........................ 65/136.1 |
| 4,707,175 * | 11/1987 | Heithoff et al. ......................... 65/27 |
| 5,569,312 | 10/1996 | Quirk et al. . |
| 5,573,568 | 11/1996 | Quirk et al. . |
| 5,795,364 | 8/1998 | Payne et al. . |
| 5,810,901 | 9/1998 | Quirk et al. . |
| 5,820,651 | 10/1998 | Quirk et al. . |
| 5,823,124 | 10/1998 | Koppang . |
| 5,833,730 | 11/1998 | Quirk et al. . |
| 5,837,028 | 12/1998 | Quirk et al. . |
| 5,849,059 | 12/1998 | Quirk et al. . |
| 5,851,256 | 12/1998 | Quirk et al. . |
| 5,855,636 * | 1/1999 | Alexander .............................. 65/27 |
| 5,893,940 * | 4/1999 | Tsai ...................................... 65/29.19 |

FOREIGN PATENT DOCUMENTS

| | | |
|---|---|---|
| 0 599 547 B1 | 6/1994 | (EP) . |
| 0 599 548 B1 | 6/1994 | (EP) . |
| 0 758 628 A2 | 2/1997 | (EP) . |
| 0 759 412 A2 | 2/1997 | (EP) . |
| 2 510 423 | 2/1983 | (FR) . |

OTHER PUBLICATIONS

"Glass Furnace Nox Control With Gas Return", Published by The American Ceramic Society, Westerville, OH—Copyright 1996 (paper presented Oct. 24, 1995).

* cited by examiner

Primary Examiner—Sean Vincent
(74) Attorney, Agent, or Firm—Sonnenschein Nath & Rosenthal

(57) ABSTRACT

During the melting of glass from charging material in furnaces with burners and regenerators for the recovery of waste heat, oxygen and primary fuel are introduced into the area around the flame roots under slightly sub-stoichiometric conditions to cover the heat requirement of the melting process. In order to further reduce the levels of $NO_x$ and CO in the waste gases by re-burning or post oxidation, secondary fuel and, further downstream, additional air are introduced beyond the flame in order to reduce the level of $NO_x$, in or above the checkerwork by means of the secondary fuel and to carry out re-burning or post oxidation downstream by means of the supply of air, so that ultimately approximately stoichiometric combustion takes place. Before the waste gases enter a waste gas stack they are used to preheat the charging material in at least one raw material pre-heater. In order to ensure an almost total recovery of the energy content of the fuel and a continuous flow of the charging material, the temperature of the waste gases coming from the regenerators is measured in front of the entry of the at least one raw material pre-heater, and the quantity of the secondary fuel is regulated according to the temperatures measured.

8 Claims, 4 Drawing Sheets

METHOD AND APPARATUS FOR MELTING GLASS IN U-FLAME AND CROSS-FIRED TANK FURNACES WITH A REDUCTION OF THE $NO_x$ AND CO CONTENT OF THE WASTE GASES

BACKGROUND OF THE INVENTION

The invention relates to a method for melting glass from charging material in U-flame and cross-fired tank furnaces with burners for fossil fuels and with regenerators for the recovery of waste heat for preheating the combustion air, whereby set amounts of oxygen and primary fuel are introduced into the area around the flame roots under slightly sub-stoichiometric conditions to cover the heat requirement for the melting process, whereby secondary fuel and additional air are introduced beyond the end of the flame in order to further reduce the content of $NO_x$, and CO in the waste gases by re-burning or post oxidation, in such a way that ultimately at least approximately stoichiometric combustion takes place, and whereby the waste gases are used to preheat the charging material in at least one raw material pre-heater before they enter the waste gas stack.

In glass furnaces with regenerators, whether cross-fired (side port) or U-flame (end port), the waste gas temperatures are normally in the range of 400–500° C. after the reversal of the flow direction of the gases in the furnace. Simultaneously, oxygen concentrations of 4 to 5% are found here, as it is not possible to keep either the regenerator chambers or the subsequent reversal valves completely sealed. Although it is possible to preheat the charging material in raw material pre-heaters with the temperatures mentioned above, it is only possible to achieve a preheating temperature of approximately 300° C. Therefore, such raw material pre-heaters and the corresponding auxiliary equipment can only be amortized over a long time period.

Methods for reducing $NO_x$ are known. One known method referred to as the "gas re-burn" method has the disadvantage that the additional combustion air has to be introduced in a part of the regenerator chamber which is relatively inaccessible, i.e., in the checkerwork, as otherwise there is insufficient time for re-burning or post oxidation, for example in order to complete the oxidation of CO to $CO_2$. Therefore excessive concentrations of CO must be expected after the filter. Furthermore, the method referred to as "gas re-burn" has the disadvantage that the energy from the supplementary fuel introduced, the so-called secondary fuel quantity, must be considered as lost unless it is used for the production of hot water or steam in a waste heat boiler. However, this method is not as economic as returning the energy directly to the process.

The publications detailed below are all concerned with the problem of reducing the oxides of nitrogen ($NO_x$) in the waste gases when melting glass in furnaces which have burners for fossil fuels and regenerative heat exchangers. The furnaces can be designed as either cross-fired or U-flame furnaces. A feature common to these furnaces is the fact that the flame direction is reversed at periodic intervals e.g., every 20 minutes. Only a part of the fuel is fed to the flame root (referred to below as the "primary fuel"), a further part of the fuel (referred to below as the "secondary fuel") is introduced beyond the flame end and within the opposite port neck and/or in the regenerative heat exchanger, and if necessary more oxygen is introduced downstream, so that when considered in total, stoichiometric combustion is achieved.

The term "gas re-burn" has become established for this process in scientific fields. The measures described are carried out in the expectation that a large proportion of the thermal energy of the secondary fuel introduced outside the furnace chamber, which can amount to between 5% and 17% of the total fuel requirement, is retained in the heat exchanger, and then transferred to the incoming combustion air, in order to compensate as far as possible for the "energy sacrifice" of maintaining clean air. However this expectation is practically unfulfillable, as the efficiency of modern regenerators cannot be increased any further.

From U.S. Pat. No. 4,372,770 and the corresponding French patent application 2 510 423 it is known that during re-burning, ammonia can be added at gas temperatures between 870° C.–1090° C. in order to reduce the oxides of nitrogen. It is further stated that before the ammonia is added, the secondary fuel should be added at temperatures of at least 1420 ° C., in order to destroy part of the oxides of nitrogen in advance. However, this necessitates the introduction of large quantities of secondary fuel and leads to a high thermal load on the materials of the heat exchanger. Furthermore, the heat exchangers are divided into primary and secondary regenerators in the direction of flow, whereby it is advantageous if the secondary fuel is introduced before the primary regenerator and the ammonia is added between the two regenerators. The building and operating costs are therefore considerable. The waste gas temperatures in the direction of the stack are given as being from 700° C.–1090° C., which leads to considerable energy losses. It is also pointed out that the mixing of the reaction components in the regenerator checkerwork is poor.

A similar method with high reaction and waste gas temperatures and two-part regenerators is described in U.S. Pat. No. 4,328,020.

From the publication by Koppang/Moyeda/Donaldson "Glass Furnace $NO_x$ Control with Gas Reburn", published by The American Ceramic Society, © 1996, pages 19 to 35, ISSN No. 0196-6219, it is known that the ratio of the final content to the initial content of $NO_x$ can be reduced from 42–46% to 15–30% with increasing injection temperature of the secondary fuel. The said injection temperature is thereby raised from 1049° C. to 1621° C. The study comes to the conclusion that approximately 50–60% of the energy from the secondary fuel can be recovered in the regenerators, whereby their temperature rises by approximately 66° C. It is also stated that a minimum time of approximately 0.3 seconds (in practice 0.5 seconds) must be available for the mixing process and the chemical reduction. These authors also come to the conclusion that local gas temperatures of at least 760–871° C. are required for this. The study comes to the further conclusion that the reduction of the nitrogen oxides to nitrogen depends to a large degree on the stoichiometry in the re-burn zone, whereby the optimum level lies in the sub-stoichiometric range between 0.8 and 0.9. It is also mentioned that the disadvantageous cost balance can presumably be partly improved in that the waste gases can be used for preheating the charging material of the glass melting furnace. However this is not possible with the high temperatures given, because the charging material becomes sticky in the raw material pre-heater and does not slide any more. In the European Patents Nos. EP 0 599 547 and EP 0 599 548, it is presumed that sub-stoichiometric combustion, i.e., combustion with an excess of primary fuel or with a deficiency of oxygen, above the glass melt can be expected to produce poor glass quality. In order to correct this it is suggested that the regenerators should be built as gas tight as possible, so that no air can enter in an uncontrolled fashion, and the process should be operated so that the waste gases at the furnace outlet and/or at the regenerator entry contain unburnt primary fuel as a result of substoichiometric combustion in the furnace, which undergoes pyrolysis on its further path into the regenerators, as a result of which radicals can be formed, which lead to a reduction of the nitrogen oxides to nitrogen.

Re-burning as a result of the addition of air occurs behind the regenerator packing, i.e., at the lower exit to the regenerator and shortly before the stack entry. The temperature at this point should be at least 650° C., and preferably higher. It is suggested that a waste heat boiler be installed in the stack to reduce the energy losses. In addition, it is suggested, albeit without a detailed description of solutions, that the waste gases be cooled down before they enter a waste gas treatment plant or electrostatic filter. However, an adequate sealing of the regenerators is practically impossible, at least with an acceptable level of investment.

It is also known from the European Patent Applications EP 0 758 628 and EP 0 759 412 that in glass melting furnaces, waste gases containing combustible materials including CO can be treated by the addition of air and by the burning of the CO beneath the regenerator packing to reduce the contents of CO and $NO_x$. Sealed regenerator chambers and the addition of suitable excess fuel in the furnace chamber or the sealed regenerators is assumed, so that the reaction temperature is higher than about 650° C. The questions of how the high temperatures may be reduced by a heat exchanger to make them suitable for raw material preheating, and how an acceptable residence time is achieved, remain unanswered.

The not pre-published U.S. Pat. No. 5,795,364 in turn describes the basic principles of the "re-burn process" in a glass melting furnace with regenerative heat exchangers for preheating the combustion air and deals specifically with the problem of improving the mixing of the individual components: primary fuel/primary air, initial combustion gases/secondary fuel and the second combustion gases/secondary air, in order to avoid fuel-rich combustion zones and to reduce the damage to furnace structural materials. This takes place without an increase in the $NO_x$ components by establishing a "coefficient of variation" (COV), which can be determined from a formula, or measured by means of sensors, which determine the gas composition in the individual planes of the combustion zones. The formula mentioned includes a standard deviation (SD) as a variable, the calculation of which leads to the coefficient of variation COV as a difference [1−SD]. The value of the coefficient of variation COV should be approximately 0.4, which results in approximately stoichiometric combustion in the individual combustion zones. The document in question does not deal with the recovery of waste heat at the outlet of the regenerative heat exchanger by means of the introduction of the waste gases into a pre-heater for the charging material, nor with the control of the maximum temperature at the entry to the pre-heater by influencing the volume of secondary fuel for the re-burning.

The not pre-published U.S. Pat. No. 5,823,124 describes a "re-burn process" in which fuel is burned with an oxidation gas in a furnace under approximately stoichiometric conditions, whereby the furnace can also be a glass melting furnace. In an afterburner, which can also be a burner port, the furnace waste gases are enriched with additional fuel and fed with the excess fuel to a burnout unit, which may be a regenerator, recuperator or reactor. Further oxidation gas is supplied to the individual burnout units, in order to achieve approximate stoichiometric combustion. The oxidation gas is hereby added at the inlet of the burnout unit. A cooling medium is added to the burnout unit in order to cool the waste gases, whereby ambient air is suggested for this application. In addition to the preheating of the oxidation gases in the burnout units, they can also be preheated in a heat exchanger in a waste gas stack. However this is the limit of the heat recovery, and the preheating of solid charging material is not mentioned. The cooling air mentioned above is, for example, fed into the waste gas stack together with its total heat content, which therefore prevents the reuse of the energy. The document also deals with the influence on the $NO_x$ content in the waste gases of variation of the oxygen content in the oxidation gas between 20–100%, and comes to the conclusion that this pollutant is at its highest level of over 6% at an oxygen content of approximately 35% and diminishes to almost zero at an oxygen level of 100%, whereby the disadvantages of operating a furnace with almost pure oxygen predominate.

A common factor of all known solutions is that the transport paths and residence times of the gas mixtures are too short for thorough mixing and post oxidation, so that the waste gas temperature is intolerably high, and that the losses through unused and unusable energy from the secondary fuel can only be partly compensated for.

The efficient removal of both $NO_x$ and CO cannot be achieved easily, as this depends on process steps which are diametrically opposed to one another. This is discussed in detail below, based on the familiar Boudouard equilibrium conditions, according to which the balance moves towards CO with increasing temperature at temperatures above 400° C. when carbon or carbon compounds are present. At 650° C., for example, the balance is between approximately 60 vol.-% $CO_2$ and 40 vol.-% CO.

SUMMARY OF THE INVENTION

An object of the invention is therefore to present a method and control system whereby the deficiencies of the known processes are eliminated and whereby both the $NO_x$ and the CO contents of the waste gases are reduced, and, within the limits of technical feasibility, with which an almost complete recovery of the energy content of the excess fuel is possible, without halting the flow of the charging material in the pre-heaters or the charging equipment at the charging end of the furnace.

This object of the invention is accomplished by the method described at the beginning in that the temperature of the waste gases from the regenerators is measured before the gases enter the at least one raw material pre-heater and in that the volume of the secondary fuels is controlled in accordance with the values of the temperatures measured, so that the waste gases have a temperature of at least 400° C. before they enter the at least one raw material pre-heater, and are preferably just below that temperature at which the charging material tends to stick.

The method according to the invention concerns a combination of batch preheating and the heating of the waste gases in such a way that the $NO_x$ content in the waste gases is considerably diminished. It has been shown, for example, that when the waste gas outlet temperature is 400° C. and the oxygen content in the waste gas is 4% the efficiency of the melting tank can be increased from 50 to 55% by preheating the charging material. If the waste gas is also heated to 600° C. by fuel supplied to the burner nozzles, the same level of efficiency is reached, but with the additional advantage that $NO_x$ is considerably reduced. Furthermore, the charging material is at a higher temperature when it enters the furnace, so that an increase in melting capacity can be expected. The level of $NO_x$ is therefore reduced without incurring additional operating costs.

The installation for the additional reduction of $NO_x$ consists in principal of a fuel controller in a bypass of the fuel supply line, by means of which the fuel quantity is regulated in accordance with the temperature in front of the raw material pre-heater. The regulated fuel quantity is supplied to the waste gas flow on the exhaust side of the regenerative furnace. The temperature controller is always connected to the exhaust side. As a result of the heating of the waste gases to 600 or 650° C. the waste gas temperature is higher than it would be if the charging material were to be preheated with a waste gas temperature of only 400° C., even when the batch preheating temperature reaches 450° C., so that it can be ensured that the temperature along the waste gas path never falls below the dew point of the waste gas components.

In particular, absorbers are very often installed in front of downstream electrostatic filters. Such absorbers use calcium hydroxide to absorb the $SO_2$ in the waste gases. This $SO_x$ absorption process operates better in comparison at higher temperatures than at low temperatures. Of course heat losses are found in the absorbers and filters along the total waste gas path, so that the invention also ensures that the condensation temperature of the $SO_x$ in the waste gases is still exceeded at the stack outlet. The method according to the invention allows the temperatures to be increased, so that the safety margin to the acid dew point can always be adjusted.

Of particular importance, however, is the fact that with the method according to the invention the use of the raw material pre-heater results in an increase in the residence time of the waste gases in the waste gas path in a temperature range in which the shift from CO to $CO_2$ according to the Boudouard equilibrium still takes place in an acceptable time period, so that the CO is also oxidized almost completely to $CO_2$, without the necessity to supply air to an inaccessible part of the regenerator chamber.

The reduction of the CO content does not take place simultaneously with the that of the $NO_x$ content; it occurs namely as a result of the oxidation of the CO whilst the gas velocity is reduced in the raw material pre-heaters, and at temperatures at which the CO oxidation still takes place fast enough even without combustion.

It is particularly advantageous here, if either individually or in a combination:
  the combustion air for re-burning, if required, is fed into the waste gases below the checkerwork of the regenerators,
  the post oxidation is at least partially carried out in the at least one raw material pre-heater,
  a bypass is installed between the waste gas flue from the regenerator to the raw material pre-heater and the waste gas flue from the raw material pre-heater to the stack, with a shut-off valve which is switched over when the flow direction in the furnace is reversed,
  the amounts of primary and secondary fuel supplied to the burners are regulated in such a way that during the furnace heating phase the amount of primary fuel required for the melting is supplied via a main fuel supply line with a first, open shut-off valve, and that during the re-burning phase such amounts of secondary fuel as are determined by the temperatures measured in the waste gases before the entry to the raw material pre-heater are supplied via a bypass line parallel to the main fuel line with a control valve and at least one second open shut-off valve, and that the temperature of the waste gases before the entry into the raw material pre-heater is at least 400° C. and preferably just below that temperature at which the charging material tends to stick, and if shut-off valves in the main supply line and in the bypass line are switched over alternately according to the reversal of the flow direction of the combustion gases above the glass melt.

The invention also concerns a control system for melting glass from charging material in U-flame and cross-fired tank furnaces with burners for fossil fuels and with regenerators for the recovery of waste heat for preheating the combustion air, whereby set amounts of oxygen and primary fuel can be introduced into the area around the flame roots under slightly sub-stoichiometric conditions to cover the heat requirement for the melting process, whereby secondary fuel and additional air can be introduced beyond the end of the flame in order to further reduce the content of $NO_x$ and CO in the waste gases by re-burning or post oxidation, in such a way that ultimately at least approximately stoichiometric combustion takes place, and whereby the waste gases can be used to preheat the charging material in at least one raw material pre-heater before they enter the waste gas stack.

In order to achieve the object of the invention a control system according to the invention is characterized by the fact that a temperature sensor for measuring the waste gas temperature is installed in the waste gas flues coming from each regenerator chamber before the entry of the waste gases into the at least one raw material pre-heater, and by the fact that the output of the temperature sensor is coupled to a control system with a controller and a control valve, by means of which the quantity of secondary fuel can be adjusted according to the temperatures measured, in such a way that before the entry into each raw material pre-heater the temperature of the waste gases is at least 400° C. and is preferably just below that temperature at which the charging material tends to stick.

It is again particularly advantageous, if within the scope of further embodiments of the invention either individually or in a combination:
  in each control system for regulating the quantities of primary and secondary fuels supplied to the burners
  a) a main fuel supply line is provided for the primary fuel with a first shut-off valve, and
  b) a bypass line is provided for the secondary fuel, parallel to the main fuel line, with a control unit and a control valve and with at least one second shut-off valve, if
  c) the output of the temperature sensor is connected to the control system and the control valve in the bypass line via a controller in such a way that such quantities of secondary fuels can be added by means of a control valve so that a waste gas temperature of at least 400° C. is reached before the entry into the raw material pre-heater and the waste gas temperature preferably lies just below that temperature at which the charging material tends to stick, and if
  d) the shut-off valves in the main supply line and in the bypass line can be switched over alternately by means of the control unit according to the reversal of the flow direction of the combustion gases above the glass melt,
  a bypass flue relative to the raw material pre-heater is installed between the waste gas flue from each regenerator to the raw material pre-heater and each waste gas flue from the raw material pre-heater to the stack, said bypass flue with a shut-off valve, which can be switched over when the flow direction is reversed.

BRIEF DESCRIPTION OF THE DRAWINGS

An embodiment of the object of the invention and its method of operation are described below and is illustrated by FIGS. 1 to 4. The figures show.

DETAILED DESCRIPTION OF THE PREFERRED EMBODIMENTS

Figure 1:
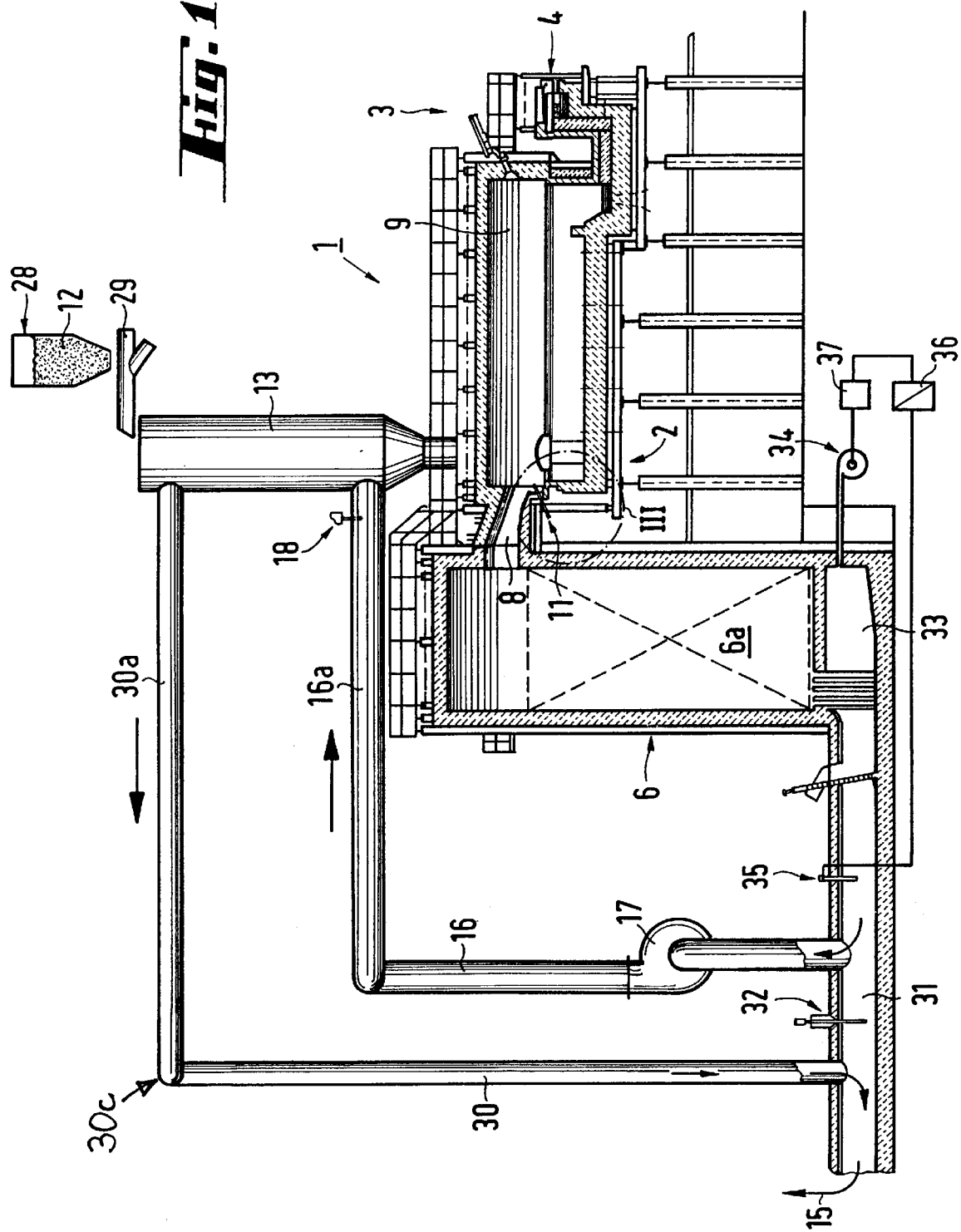
FIG. 1 is a vertical longitudinal section through a U-flame furnace and through two re-generators along the line I—I in FIG. 2.
Figure 2:
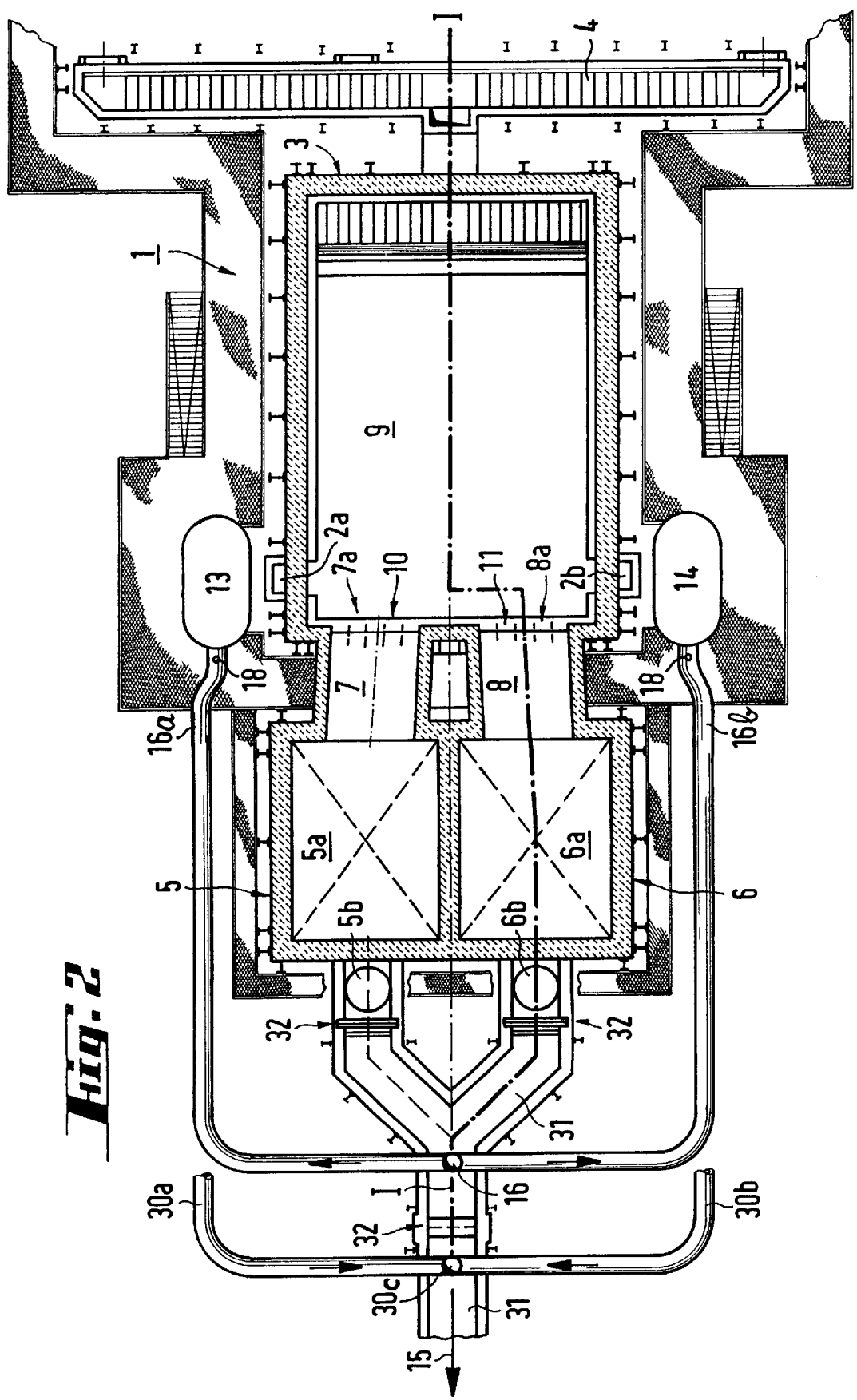
FIG. 2 is a plan view of the furnace of FIG. 1, partially sectioned.

FIGS. 1 and 2 show a U-flame furnace (referred to below as "the furnace"), which has a charging end 2 with two doghouses 2a and 2b situated laterally and an extraction end 3, which is connected to a distribution tank 4. Two regenerator chambers 5 and 6, with checkerwork 5a and 6a for the recovery of waste heat for preheating the combustion air, are installed in front of the charging end 2, and are coupled to the combustion chamber 9 of the furnace 1 by means of flow channels 7 and 8. The regenerators 5 and 6 are operated alternately with periodic flow reversal (arrows 38 and 39 in FIG. 3). The primary air is supplied to the regenerators 5 and 6 through the primary air inlets 5b and 6b.

Figure 3:
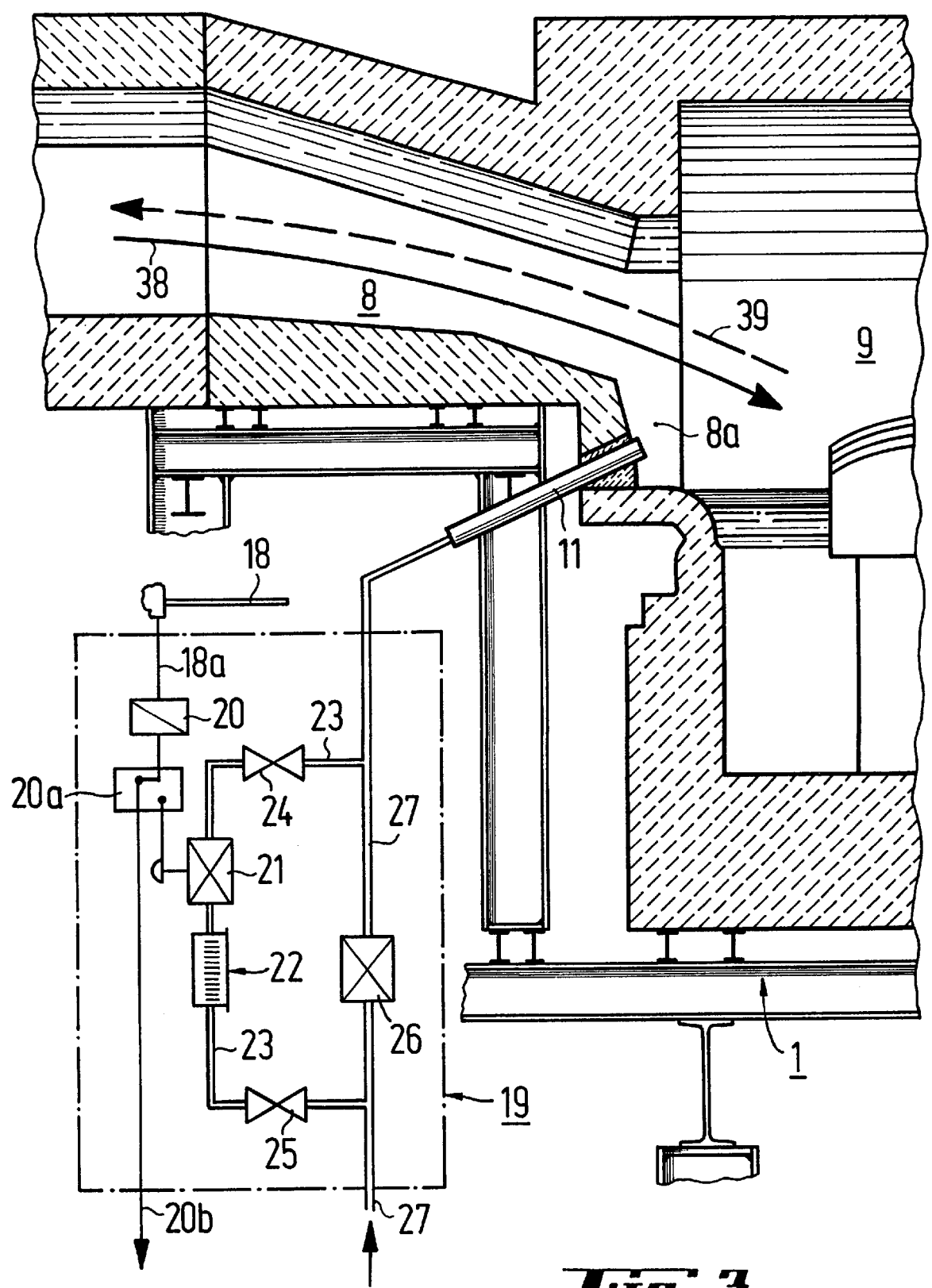
FIG. 3 is the section in circle III of FIG. 1 on a much enlarged scale with a schematic control circuit.

On the furnace side the flow channels 7 and 8 end in burner ports 7a and 8a, each of which is equipped with a group of 4 burners 10 and 11 (indicated by dashed lines) installed in an underport arrangement (FIG. 3). In accordance with FIG. 2, the arrangement is mirror-symmetric. As the method of operation is known, it is not explained here in detail.

Controlled and preset quantities of oxygen and primary fuel are introduced in the region of the burners 10 and 11 and/or the flame roots on one side of the furnace at a time, with slightly sub-stoichiometric conditions and with lower $NO_x$, levels in the waste gases, to supply the heat required for the melting process. In order to further reduce the $NO_x$, content in the waste gases by re-burning, secondary fuel is introduced beyond the flame ends through the other burners 10 or 11, in such a way that at least approximate stoichiometric combustion takes place as a result of the additional air supplied downstream. The waste gases from the regenerators 5 and 6 are subsequently passed through a main waste gas flue 31 to a stack 15, which is only indicated here.

Raw material pre-heaters 13 and 14 for preheating the charging material 12 are installed above each doghouse 2a and 2b, and the waste gases from the regenerators 5 and 6 are passed to these pre-heaters 13 and 14 before entering the waste gas stack 15. This is achieved by means of a further waste gas flue 16, in which a fan 17 is installed, and which is connected to the main waste gas flue 31. The waste gas flue 16 divides into parallel waste gas flues 16a and 16b (FIG. 2) for parallel connection of the raw material pre-heaters 13 and 14. A temperature sensor 18 for measuring the waste gas temperature is installed in each of the waste gas flues 16a and 16b immediately in front of the entry into the raw material pre-heaters 13 and 14.

As shown in FIG. 3, output 18a of the temperature sensor 18 is connected to a control system 19 (enclosed by a dash-dotted line) which has a controller 20 and a control valve 21, that regulate the quantity of secondary fuel according to the temperatures measured. The fuel quantity is indicated by a flow meter 22. The control valve 21 and the flow meter 22 are installed in a bypass line 23, in which there are also two shut-off valves 24 and 25. The bypass line 23 bypasses a shut-off valve 26, which is installed in a main supply line 27 for the fuel, and which also receives its control commands from the control system 19. The shut-off valves 24 and 25 are open during the re-bun phase, and the shut-off valve 26 is closed. A switch 20a can be used to pass the output of the controller 20 via a cable 20b alternately to a parallel control system for each burner group.

Control is carried out in such a way that in front of the entry to each of the raw material pre-heaters 13 and 14, the waste gases have a temperature of at least 400° C. and are preferably just below the temperature at which the charging material tends to stick. Experience has shown that the waste gases can be at temperatures between 600° C. and 650° C. when they enter the raw material pre-heaters 13 and 14. Initially the charging material 12 is in a silo 28 from where it is transported by a vibratory conveyor 29 into the respective raw material pre-heater 13 and/or 14.

The shut-off valve 26 in the main supply line 27, and the shut-off valves 24 and 25 in the bypass line 23, are reversed alternately in accordance with the reversal of the flow direction of the combustion gases above the glass melt by means of a control system not shown in the figure. The reversal cycle time is approximately 20 minutes.

Two waste gas flues 30a and 30b lead from the two raw material pre-heaters 13 and 14, which are connected in parallel, to a junction point 30c of a common waste gas flue 30, which in turn connects into the main waste gas flue 31.

Three adjustable slide valves are installed in the main waste gas flue 31 in order to prevent a short circuit in the flow, which would cause a bypassing of the raw material pre-heaters 13 and 14, and/or to prevent the waste gases being sucked back in by the fan 17.

Fans 34 supply controlled amounts of additional air into the chamber base 33 after each of the checkerworks 5a and 6a whereby the volume of air supplied is sufficient to produce at least approximate stoichiometric combustion. Control is by means of an oxygen sensor 35 and a controller 36, which in turn controls a frequency converter 37 connected to the drive motor of the fan. The flow paths and the residence times of the waste gases to the outlet of the raw material pre-heaters 13 and 14 are increased considerably and therefore at least approximate stoichiometric combustion and/or oxidation of the remaining fuel quantities, including the secondary fuel, ultimately take place. This process is concluded at the latest at the gas outlet of the raw material pre-heaters 13 or 14, as is the almost complete reduction of the remaining $NO_x$. It is of course also possible to use oxygen or oxygen-enriched air so that the volume of waste gas is decreased. Above approximately 600° C. combustion occurs and below approximately 600° C. oxidation takes place.

FIG. 3 shows the opposing flow paths of the preheated combustion air (arrow 38) and the waste gases (arrow 39). It is evident that the same burners 10 and 11 are operated alternately to supply primary or secondary fuel, so that additional burners are not necessary.

1$^{st}$ COMPARATIVE EXAMPLE

In an installation according to FIGS. 1–3, 240 tonnes per day of charging material consisting of batch with a cullet ratio of 70% were melted in the furnace with an efficiency of 50%, but without a reduction in the level of $NO_x$. The theoretical energy consumption amounted to 2,430 kJ/kg glass, while the actual energy consumption amounted to 4,860 kJ/kg glass. The theoretical waste gas volume with 0% $O_2$ was 14,175 Nm$^3$/h and 17,506 Nm$_3$/h with 4% $O_2$. The batch gases amounted to 923 Nm$^3$/h. Gas emissions totaled 18,429 Nm$^3$/h.

The batch temperature after the raw material pre-heater was 250° C. This calculates to an energy supply of 2,310,000 kJ/h and energy savings of 4,620,000 kJ/h at an efficiency of 50% in the furnace. The fuel gas savings amounted to 128 Nm³/h. The waste gas volume amounted to 15,846 Nm³/h at an $O_2$ ratio of 4%. With batch gas emissions of 923 Nm³/h a total waste gas volume of 16,767 Nm³/h was achieved. The efficiency of the furnace was 55%.

2$^{nd}$ COMPARATIVE EXAMPLE

In an installation according to FIGS. 1–3, 240 tonnes per day of charging material, consisting of batch with a cullet ratio of 70%, were melted in the furnace with an efficiency of 50%, but with a reduction in the $NO_x$, level. The theoretical energy consumption amounted to 2,430 kJ/kg glass, while the actual energy consumption was 4,860 kJ/kg glass. The theoretical waste gas volume with 0% $O_2$ amounted to 14,175 Nm³/h and 17,506 Nm³/h with 4% $O_2$. The batch gases amounted to 923 Nm³/h. Gas emissions totaled 18,429 Nm³/h.

As a result of the use of secondary fuel the batch temperature after the raw material pre-heater was 450° C. This calculates to an energy supply of 4,500,000 kJ/h and energy savings of 9,000,000 kJ/h at an efficiency of 50% in the furnace. The fuel gas savings amounted to 250 Nm³/h. A waste gas volume of 14,264 Nm³/h at an $O_2$ ratio of 4% was produced. With batch gas emissions of 923 Nm³/h a total waste gas volume of 15,187 Nm³/h was achieved. The furnace efficiency was 61.3%.

3$^{rd}$ COMPARATIVE EXAMPLE

The test as described in the second example was repeated, but it differed in that the waste gas temperature was increased to 600° C. by the addition of a larger volume of secondary gas.

The batch temperature after the raw material pre-heater was 600° C. as a result of the use of 127 Nm³/h secondary fuel. At 4% $O_2$ the waste gas volume amounted to 16,834 Nm³/h. The waste gas temperature after the raw material pre-heater taking the preheating losses into consideration, amounted to 386° C. and the total fuel gas volume was 1,227 Nm³/h, equivalent to 4,416 kJ/kg glass. The efficiency level of the furnace was 55.02%.

Figure 4:
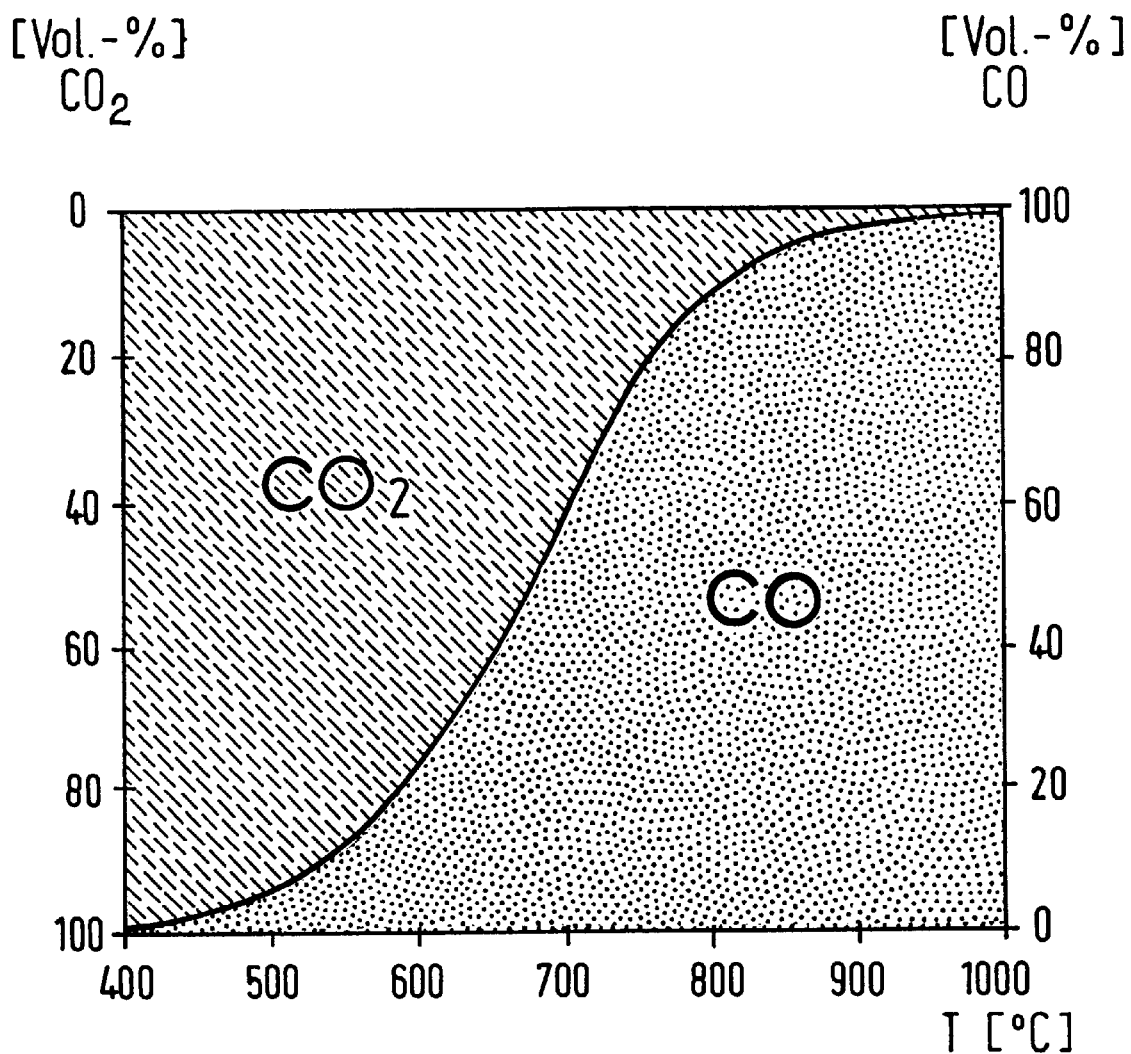
FIG. 4 is the Boudouard equilibrium diagram.

FIG. 4 shows the so-called Boudouard equilibrium diagram, which illustrates the process of oxidation from CO to $CO_2$. Temperatures from 400–1000° C. are shown on the abscissa, while the relative volume content of $CO_2$ is shown on the left ordinate and the relative volume content of CO is shown on the right ordinate [source: "Manual of Inorganic Chemistry" by Hollemann/Wiberg, 1958, page 306, published by Walter de Gruyter & Co. Berlin].

The diagram shows that at temperatures of 400° C. and in the presence of carbon or carbon compounds the balance between CO and $CO_2$ shifts very strongly towards CO as temperature increases. Therefore at 650° C. there is a balance between approximately 60 vol. % $CO_2$ and 40 vol.-% CO. This indicates that with energetically favorable waste gas temperatures for the highest possible batch preheating, the unwanted formation of CO in the waste gases increases strongly.

In contrast to this, the surprising effect of the object of the invention is based on the temperature control of the quantity of secondary fuel relative to the primary fuel as described by the invention, combined with the use of the raw material pre-heater in the waste gas path. The combined effect of these ensures that the temperature of the waste gases lies in an advantageous range in which, as a result of the Boudouard equilibrium, the shift from CO to $CO_2$ takes place within an acceptable time period, and that as a result of the additional flow paths in the raw material pre-heaters, the residence time is extended so that the CO is almost completely oxidized to $CO_2$, without the necessity to add air in an inaccessible part of the regenerator chamber.

The reduction of the CO content does not take place simultaneously with that of the $NO_x$ content, as it occurs by oxidation of the CO present during the phase of lower gas velocity in the raw material pre-heaters at temperatures at which the CO oxidation still takes place fast enough even without combustion.

The invention can be summarized as follows:

When melting a glass from charging materials 12 in a furnace 1 with burners 10 and 11 and with regenerators 5 and 6 for the recovery of waste heat, oxygen and primary fuel are supplied in the region around the flame roots under slightly sub-stoichiometric conditions to cover the energy requirement for the melting process. In order to further reduce the contents of $NO_x$, and CO in the waste gases by means of reburning or post oxidation beyond the flame, secondary fuel and, further downstream, additional air are added so that $NO_x$, is reduced by means of the secondary fuel in or above the checkerwork 5a and 6a and reburning or post oxidation of the CO takes place downstream as a result of the introduction of air, such that finally approximately stoichiometric combustion takes place. The waste gases are used to heat the charging material in at least one raw material pre-heater 13 and 14 before they enter a waste gas stack 15. In order to ensure almost complete recovery of the energy content of the fuel and a continuous flow of the charging material, the temperature of the waste gases from the regenerators 5 and 6 are measured in front of the entry into the at least one raw material pre-heater 13 and 14, and the volume of the secondary fuel is adjusted in accordance with the temperatures measured.

The secondary fuel need not be identical with the primary fuel; and the use of methane is advantageous as a secondary fuel. All known types of equipment such as direct or indirect heat exchangers can be used as raw material pre-heaters; however particular preference is shown for those raw material pre-heaters which have a particularly large cross section in relation to the amount of raw material flowing per unit time and therefore achieve a long residence time for raw materials and waste gases. From the above description, it is apparent that the objects of the present invention have been achieved. While only certain embodiments have been set forth, alternative embodiments and various modifications will be apparent from the above description to those skilled in the art. These and other alternatives are considered equivalents and within the spirit of scope of the present invention.

It should be understood that I wish to embody within the scope of the patent warranted hereon all such modifications as reasonably and properly come within the scope of my contribution to the art.

I claim as my invention:

1. A process for melting glass from charging material, which charging material begins to stick at a predetermined temperature, in U-flame and cross-fired furnaces with burners for fossil fuels and with regenerators for recovery of waste heat from waste gases for preheating combustion air, comprising the steps of:

adding controlled quantities of oxygen and primary fuel in an area around flame roots at said burners under slightly sub-stoichiometric conditions to provide an amount of heat required for the melting process, adding secondary fuel and additional air further downstream of the flame to further reduce $NO_x$, and CO contents of the waste gases by re-burning beyond the flame, such adding occurring in such a way that ultimately approximately stoichiometric combustion takes place using the waste gases to preheat the charging material in at least one raw material pre-heater before the waste gases enter a waste gas stack, measuring a temperature of the waste gases from the regenerators in front of an entry of the at least one raw material pre-heater, and adjusting a quantity of the secondary fuel in accordance with the temperatures measured, so that the temperature of the waste gases in front of the entry into the at least one raw material pre-heater is at least 400° C.

2. The process according to claim 1 including the step of adjusting the quantity of the secondary fuel so that the temperature of the waste gases in front of the entry into the at least one raw material pre-heater remains below said temperature at which the charging material tends to stick.

3. The process according to claim 1, including the steps of providing said regenerators with a checkerwork for receiving waste gases, and introducing combustion air into the waste gases below the checkerwork of the regenerators for re-burning.

4. The process according to claim 3, including the step of oxidizing the waste gases at least partially in the at least one raw material pre-heater.

5. The process according to claim 1, including the steps of regulating the amounts of primary and secondary fuel supplied to the burners in such a way that during a furnace heating phase the steps include introducing the quantity of primary fuel required for the melting via a main supply line with a first, open shut-off valve and during a re-burning phase, introducing such quantities of secondary fuel by a bypass line parallel to the main fuel supply line, providing said bypass line with a control valve and at least one second, open shut-off valve, varying the quantity of secondary fuel in accordance with the temperature measurement of the waste gas in front of the entry into the at least one raw material pre-heater in such a way that the temperature of the waste gases in front of the entry into the raw material pre-heaters is at least 400° C. and is below the temperature at which the charging material tends to stick, and alternatively switching over the shut-off valves in the main supply line and in the bypass line in accordance with the reversal of the flow direction of the combustion gases above the glass melt.

6. A control system for melting glass from charging material in U-flame and cross-fired furnaces having primary and secondary burners for fossil fuels and having regenerators for the recovery of waste heat from waste gases for the preheating of combustion air, said control system being arranged to control and introduce amounts of oxygen and primary fuel into an area around flame roots at said burners to provide a heat requirement of a glass melting process, said control system further being arranged to control and introduce secondary fuel and additional air downstream of a flame from said primary burners, in order to further reduce a $NO_x$ and CO content in the waste gases by means of at least one of re-burning and post oxidation in such a way that ultimately approximately stoichiometric combustion takes place, at least one raw material pre-heater arranged to receive waste gases from said furnace and said burners for the preheating of the charging material upstream of a waste gas stack, said control system comprising:

a controller and a control valve in a secondary fuel line, a temperature sensor, for measuring the waste gas temperature, installed in each flue for the waste gases emitted from the relevant regenerator, in front of the entry to the at least one raw material pre-heater, said temperature sensor having an output connected to the controller and control valve, such that a quantity of secondary fuel is regulated in accordance with the measured waste gas temperatures to maintain said waste gas temperature at said sensor at least at 400° C.

7. The control system according to claim 6, wherein said control system is arranged to maintain the measured waste gas temperature at said sensor below a temperature at which the charging material tends to stick.

8. The control system according to claim 6, wherein each control system for the regulation of the amounts of primary and secondary fuels supplied to the burners comprises:

a main supply line for the primary fuel with a shut-off valve, a bypass line, installed parallel to the main supply line, for the secondary fuel, with the controller and the control valve provided therein and further having at least one second shut-off valve, a connection of the output of the temperature sensor to the control system and the control valve in the bypass line through the controller in such a way that it is possible to add such quantities of secondary fuel to the waste gases in front of the entry into the raw material preheater by means of the control valve so that the temperature of the waste gases in front of the entry into the raw material pre-heater is at least 400° C. and is below the temperature at which the charging material tends to stick, and an arrangement for the shutoff valves in the main supply line and in the bypass line to be switched over alternately by the control system in accordance with a reversal of a flow direction of the combustion gases above a glass melt in the furnace.

* * * * *